UNITED STATES PATENT OFFICE.

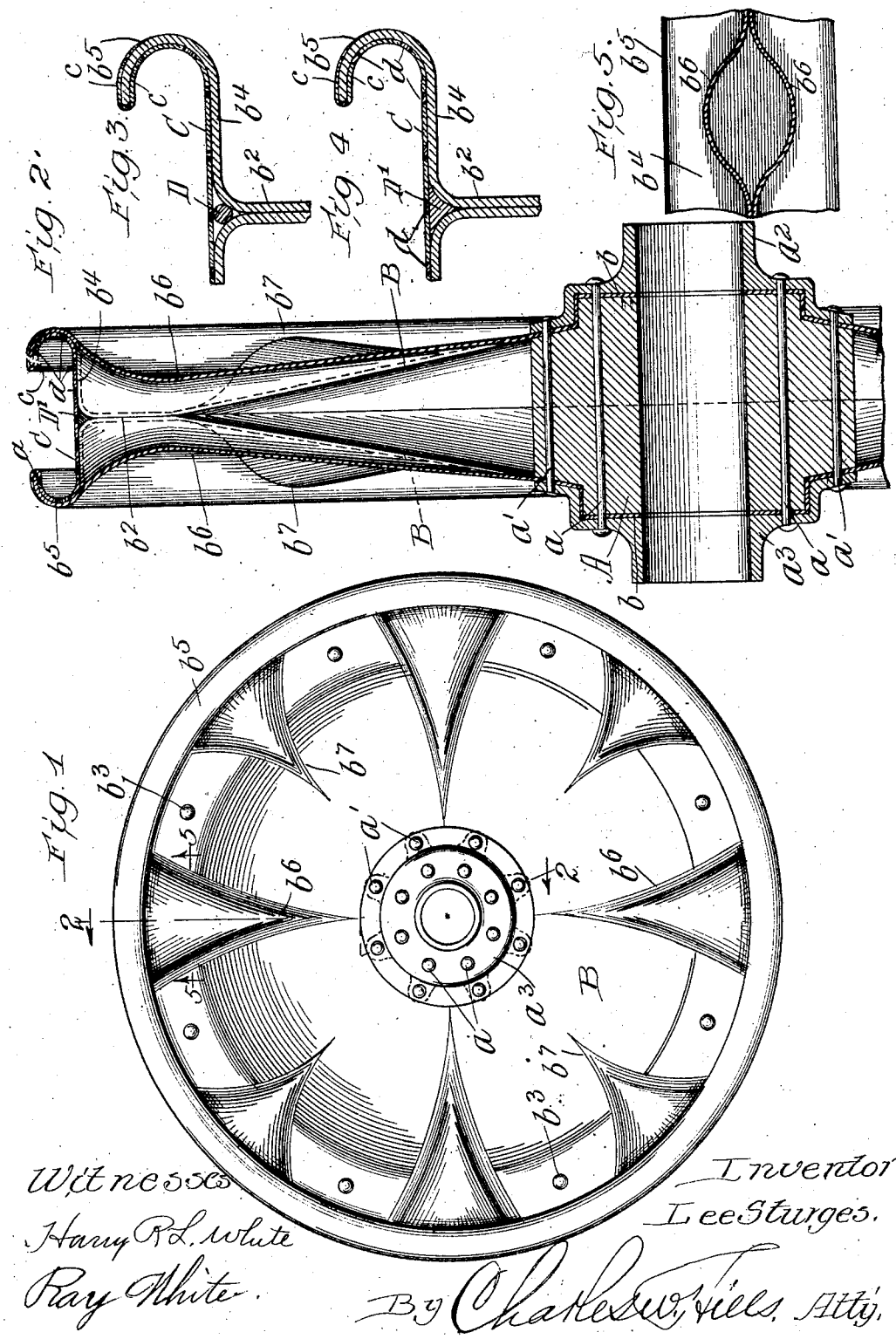

LEE STURGES, OF CHICAGO, ILLINOIS.

VEHICLE-WHEEL.

No. 833,183.   Specification of Letters Patent.   Patented Oct. 16, 1906.

Application filed October 9, 1905. Serial No. 282,071.

*To all whom it may concern:*

Be it known that I, LEE STURGES, a citizen of the United States, and a resident of Chicago, Cook county, Illinois, have invented certain new and useful Improvements in Vehicle-Wheels; and I do hereby declare that the following is a full, clear, and exact description of the same, reference being had to the accompanying drawings, and to the letters of reference marked thereon, which form a part of this specification.

This invention relates to improvements in vehicle-wheels, and is shown more particularly as an automobile-wheel adapted to receive a rubber tire. Heretofore vehicle-wheels of this kind have usually been constructed of wood and are made heavy in proportion to their strength, and the spokes present considerable resistance to the atmosphere and also collect and retain the dust of the road. For the lighter vehicles such have also been constructed with wire spokes. These have not been sufficiently strong to stand the rough usage such vehicle-wheels are subjected to and in consequence are short-lived.

The object of this invention is to construct a wheel of pressed sheet metal, so as to afford great resiliency and strength at the rim to withstand the wear of the road and in which, though strong and durable, the weight is reduced to a minimum.

It is a further object of the invention to afford a construction in which a hub of any desired kind is adapted to be used in connection with a wheel embodying my invention and in which the construction as a whole is light, strong, cheap, and pleasing to the eye.

The invention consists in the matters hereinafter described, and more fully pointed out and defined in the appended claims.

In the drawings, Figure 1 is a side elevation of a wheel embodying my invention. Fig. 2 is an enlarged vertical section taken on line 2 2 of Fig. 1. Fig. 3 is an enlarged fragmentary detail illustrating the construction of the rim and showing the parts before brazing. Fig. 4 is a similar view showing the parts after brazing. Fig. 5 is an enlarged fragmentary section taken on line 5 5 of Fig. 1.

As shown in the drawings said wheel comprises a hub A, which may be of any form or construction and adapted to be either rigidly secured on the axle or to be rotatably secured thereon and to receive an internal antifriction-bearing, dependent on whether it is to be secured on a rear or front axle of the automobile. Secured upon said hub are duplicate pressed-steel sections or plates B, which are dished outwardly at the center and are identical in form and construction and which, as shown, are apertured at the center to receive the axle therethrough and which are flanged outwardly, as shown by $b$, to engage closely to the ends of the hub A and are rigidly secured to the hub by means of bolts $a\ a'$, which extend through collars $a^2$ and $a^3$ concentric with the hub and wheel, through said sheets or plates, and the hub, as shown in Figs. 1 and 2. Said plates each incline inwardly or converge to near the tread, near which point a flat contacting surface $b^2$ is afforded and at which points the plates are firmly riveted together, whereby the rims are rigidly secured together. Peripherally beyond said contact-faces said disks or plates are pressed outwardly, affording a relatively flat or slightly concave tread-flange $b^4$, the edges of which curve inwardly, affording clencher-flanges $b^5$, between which fits a shell of metal C, which lies flat on the tread-flanges $b^4$ and the edges of which are formed to coincide closely with the inner side of the clencher-flanges and are reduced to a thin edge in thickness and are rolled over the peripheral clencher-flanges $b^5$, as shown in Figs. 3 and 4. Said rim C is perforated throughout its entire extent, and, as shown, a brass or other suitable fusible wire D is secured within the angle formed by the divergent flanges $b^4$ and the tread-rim C, as shown in Fig. 3, and the wheel-rim when the construction is assembled is dipped into a molten bath at the proper temperature to melt said wire, which, together with the metal flowing into said space between the tread-rim and disks, brazes all together, as indicated by D'. The molten metal also fills into the apertures in the tread-rim and rigidly brazes all parts of said rim to the periphery of the wheel.

Conveniently in pressing the wheel disks or sections B ribs $b^6\ b^7$ are formed between the rivets $b^3$, which extend bracingly from the outer side of the tread-flange radially inwardly to a point between the contacting faces of the disks or sections and the hub, as shown in Figs. 1 and 2, and serve to greatly stiffen the tread on the wheel, while not detracting from its resiliency.

The operation is as follows: The operation is obvious from the construction described. The disks are constructed of two pressed-steel disks separated at the center by the hub inserted between the same and are brought together at the periphery, so that one disk braces the other, enabling a light gage of sheet metal to be used. The outwardly-pressed ribs between the rivets may be of any desired number, shape, or length. The hub is bolted in place before the tread is brazed and may also be brazed to the disks or wheel-sections, if desired. The tread or rim, shaped to afford engagement with any kind of tire, is firmly clenched together by the band or rim C, which when brazed thereto affords a structure of great strength. The hub of course may be of any desired form or configuration and adapted either to be rigidly secured to the axle or to contain within itself antifriction-bearings of any kind, and the wheel disks or sections may be secured to the hub in any suitable manner. I therefore do not purpose limiting this application for patent otherwise than necessitated by the prior art, as many details of construction may be varied without departing from the principles of my invention.

I claim as my invention—

1. A vehicle-wheel comprising two duplicate pressed-steel sections each forming half of the wheel and each bracing the other rigidly secured together between the hub and the rim, a tread-flange on each section and a tire-rim encircling the same and affording a recess beneath its center and metal molded in said recess.

2. A vehicle-wheel comprising two duplicate pressed-steel sections, a hub spacing the same apart at the center and rigidly connecting the same, said sections contacting near the periphery and riveted together, an outwardly-directed tread-flange on the periphery of each, a tire-rim secured on said flanges and providing a recess beneath the same, metal molded into and filling said recess, and integral radial ribs extending from said flanges bracing inwardly on each section.

3. In a wheel of the class described comprising two duplicate pressed-steel sections, each forming half of the wheel and bent outwardly at the center to conform with a hub and tapering inwardly to meet at a point near the periphery, an integral peripheral flange on each, a complemental tread-rim engaged on and between said flanges and brazed thereto, and broad bracing-ribs tapering from said flanges inwardly toward the center.

4. A wheel comprising two duplicate pressed-steel sections each dished from near the periphery to the center, a tread-flange at the periphery of each, a tire-clenching edge thereon, a hub spacing the centers apart and rigidly connecting the same, rivets holding the sections together beyond the dished portion of each, a perforated tire-rim seated between the tread-flanges and metal molded into said perforations and beneath the rim acting to rigidly bind the same in place.

5. A wheel comprising pressed-steel sections bracingly secured together and having a flanged periphery, a tire-rim having closely-arranged perforations and engaged on and clenching over said flanges and affording a recess at the periphery of said sections and metal molded into said recess and perforations.

6. A wheel comprising pressed-steel sections bracingly secured together, a flange on the periphery of each, a tire-rim engaged on said flanges and closely apertured and adapted to be brazed thereto and brazing metal filling the angle between the flanges of said sections and the rim.

In testimony whereof I have hereunto subscribed my name in the presence of two subscribing witnesses.

LEE STURGES.

Witnesses:
C. W. HILLS,
JOHN PERCY.